Patented July 3, 1951

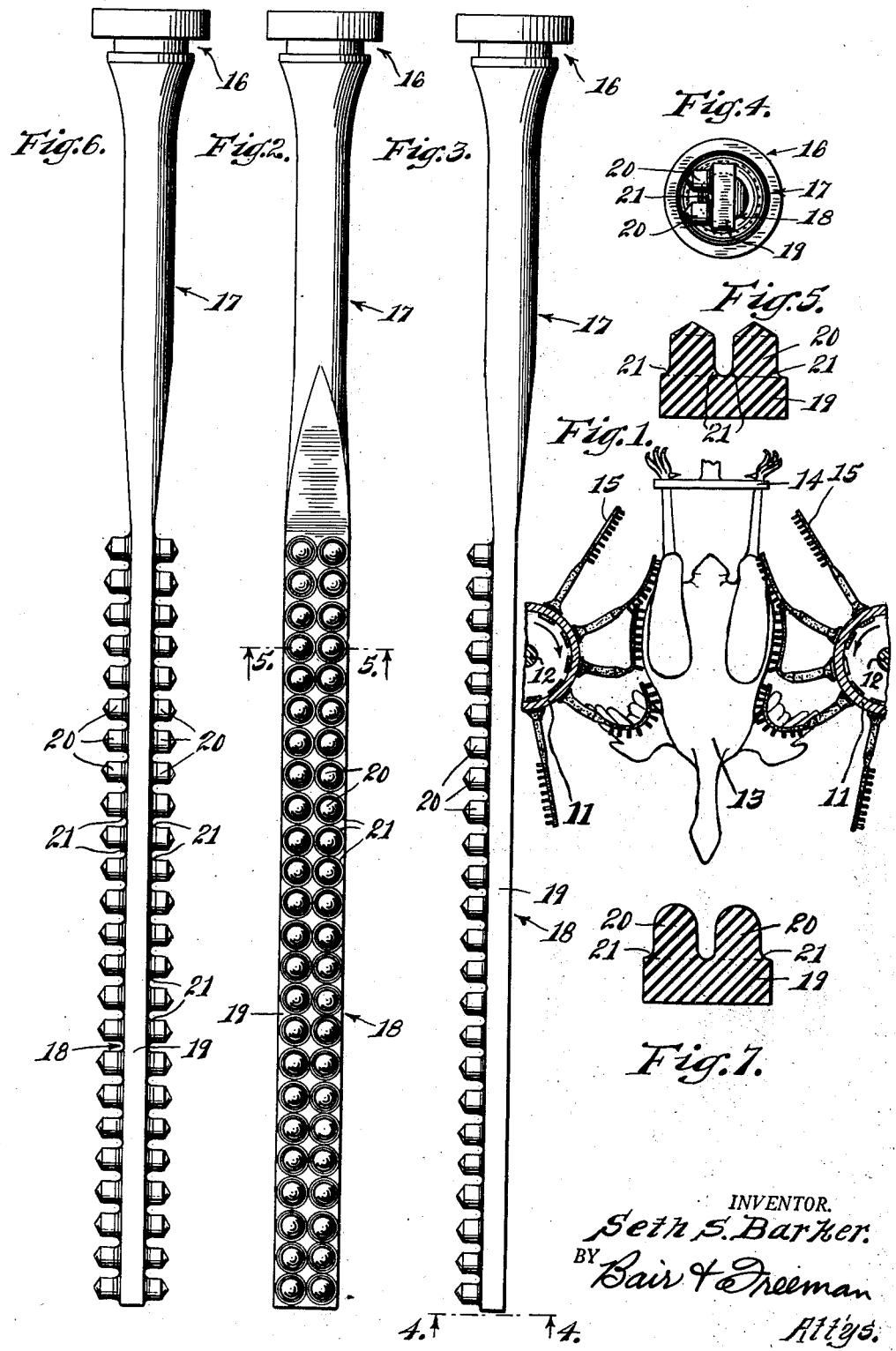

2,559,001

UNITED STATES PATENT OFFICE 2,559,001

CHICKEN PICKING FINGER

Seth S. Barker, Ottumwa, Iowa

Application January 28, 1950, Serial No. 141,016

6 Claims. (Cl. 17—11.1)

This invention relates to a chicken picking finger and more particularly to a chicken picking finger of novel and improved design which picks chickens in a superior manner and which is characterized by its relatively long operating life.

It is an object of this invention to provide a chicken picking finger which is relatively soft and flexible and which in use will quickly, easily, and effectively pick chickens.

Another object of this invention is to provide a chicken picking finger of novel design which may be inexpensively produced and which is characterized by its relatively long operating life.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a diagrammatic view of an apparatus for picking chickens which is equipped with the novel and improved chicken picking finger;

Figure 2 is a plan view of the chicken picking side of the improved chicken picking finger;

Figure 3 is a side view of the improved chicken picking finger shown in Figure 2;

Figure 4 is an end view of the chicken picking finger taken on the line 4—4 of Figure 3;

Figure 5 is an enlarged cross sectional view of the chicken picking finger taken on the line 5—5 of Figure 2;

Figure 6 is a side view of a modified form of the novel and improved chicken picking finger; and Figure 7 is an enlarged cross sectional view, similar to the view shown in Figure 5, of a modified form of the novel and improved chicken picking finger.

Referring to the drawings, a chicken picking machine is exemplified diagrammatically in Figure 1 in which a pair of rotating drums 11 are partially shown. These drums 11 are mounted on shafts 12 which may be journalled in any suitable supporting bearings, and are rotated by any suitable drive means, the bearings and drive means being omitted from the drawing. The drums 11 are spaced apart as shown to permit passage, therebetween, of the fowl 13 to be picked. The fowl 13 is shown suspended head down from a suitable foot shackle 14 which is supported by any suitable conveyor means (not shown).

The fowl 13 is passed longitudinally between the rotating drums 11 which drums have picking fingers mounted on their periphery throughout most of their length. The fingers 15 are disposed radially around the drums 11 as indicated in Figure 1, and rows of the fingers 15 are disposed longitudinally on the drums 11.

The fowl 13 passes between the picking drums as indicated in Figure 1, so that as the drums 11 turn, the fingers 15 come into contact with the fowl 13, bend substantially as shown, and rub along the surface of the fowl, pulling off the feathers.

These fingers 15 are quite soft, and when the drums 11 are not rotating the fingers 15 hang limply. However, in Figure 1 the drums 11 are shown revolving rapidly and the centrifugal force is sufficient to extend the fingers 15 radially outward from drums 11 as shown. The drums 11 rotate in the directions indicated by the arrows.

Referring in particular to the picking finger 15, Figures 2 to 5 show in detail the construction details. The finger 15 is divided substantially into three portions, the mounting portion 16, a shank portion 17, and the picking portion 18. The mounting portion 16 is shown grooved so as to permit mounting of the finger in existing chicken picking machines. The form of the mounting portion 16 is not important and any appropriate mounting means may be used. The shank portion 17 is a transition portion between mounting portion 16 and picking portion 18. The general form of the shank portion 17 is not important and need not be of the form shown. Except for the fact that the shank portion of the finger adjacent the mounting portion 16 does not contact the fowl during the picking operation there would be no need for the shank portion 17 and the picking portion 18 could extend directly from the mounting portion 16.

The picking portion 18 of the picking finger 15 comprises an elongated body 19 of substantially rectangular cross section. One of the wider sides of the rectangular body 19 has extending therefrom a plurality of longitudinal rows of nipples 20. These nipples 20 are integral with the body 19 and are flexible as is the rest of the finger 15.

The nipples 20 are substantially cylindrical in cross section and extend substantially at right angles from the face of the rectangular body 19. Although the nipples 20 are of the same material as the rest of the finger 15, the nipples 20 appear to be stiffer when compared to finger 15 as a whole, because the unsupported length of the nipples is much less. The junctures between the body 19 and the nipples 20 are strengthened by the inclusion of fillets 21, which fillets are integral with the base 19 and the nipples 20. During the picking operation, the nipples 20 are subjected to repeated bending and the reinforcing of the base of the nipples 20 by means of fillets 21 greatly increases the operating life of the finger 15.

The longitudinal rows of nipples are mounted on a plain surface which surface may be of greater or lesser width as desired. A wider finger covers a greater area of the body of the fowl, as compared to a round finger wherein the width of the longitudinal portion of the finger tangent to the fowl is limited by the radius of the round finger.

In the operation, as the radially extended finger swings around and strikes the bird, the movement of the finger is momentarily stopped and since the mounting portion of the finger continues onward, the finger bends at some point along its length. The finger must continue on and does so along the body of the bird, the nipples on the finger acting to pull off the feathers. These nipples are particularly successful in removing pin feathers in that they provide a plurality of small resilient members which strike the pin feathers adjacent the base of the pin feathers so as to force the pin feathers out from the skin of the bird without breaking the skin. Also, when the finger is revolving freely in its radially extended position, the finger is stretched radially by reason of the centrifugal force. Then when the finger strikes the body and is slowed down, the centrifugal force on the extended end of the finger is reduced and the elasticity of the rubber molecules cause the finger to contract towards its normal length. Thus, when the finger first strikes the bird and the nipples contact feathers, immediately thereafter the finger tends to shorten and the nipples exert a pulling action on the feathers in addition to the dragging action on the feathers by reason of the motion of the finger along the body of the bird. It is felt that this contracting action of the stretched finger is particularly useful in the removal of all feathers, particularly pin feathers.

The tips of the nipples as shown in the preferred form in Figure 5 are conical, tapering to the apex of the cone at the outermost tip of the nipples. A modified form of the nipples is shown in Figure 7 in which the extended end of the nipple is shown as being rounded in form. The particular nipple tip shown in Figure 7 is semispherical.

In the general form of the finger, only one side of the finger is used for the picking operation and hence nipples are supplied on only one side of the picking finger as shown in Figure 3 of the drawing. A modified form of the picking finger is shown in Figure 6 in which nipples are mounted on opposite sides of a finger. It is intended that when the nipples wear out on one side of the finger, then the finger may be rotated 180° and the reverse side of the finger may then be used as a new finger. This should approximately double the operating life of a picking finger.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A fowl picking finger of the character described comprising a solid body of soft flexible material, said body including a mounting portion, a shank portion, and a picking portion, said picking portion being of uniform rectangular cross section and having an elongated rectangular plan form, and a plurality of longitudinal rows of nipples extending from the picking portion of said body.

2. A fowl picking finger of the character described comprising a solid body of soft flexible material, said body including a mounting portion, a shank portion, and a picking portion, said picking portion being of uniform rectangular cross section and having an elongated rectangular plan form, and a plurality of longitudinal rows of nipples extending from the picking portion of said body, said nipples being of uniform cylindrical cross section over a greater portion of their height.

3. A fowl picking finger of the character described comprising a solid body of soft flexible material, said body including a mounting portion, a shank portion, and a picking portion, said picking portion being of uniform rectangular cross section and having an elongated rectangular plan form, a plurality of longitudinal rows of nipples extending from the picking portion of said body, said nipples being of uniform cylindrical cross section over a greater portion of their height, and the extended tips of said nipples being conical in form.

4. A fowl picking finger of the character described comprising a solid body of soft flexible material, said body including a mounting portion, a shank portion, and a picking portion, said picking portion being of uniform rectangular cross section and having an elongated rectangular plan form, a plurality of longitudinal rows of nipples extending from the picking portion of said body, and reinforcing means at the base of the nipples, between the nipples and said body, to provide greater strength for withstanding repeated deflections of the nipples.

5. A device as set forth in claim 1, wherein the nipples extend from a pair of opposite sides of the picking portion of said finger.

6. A device as set forth in claim 2, wherein the extended tips of the nipples are rounded in form.

SETH S. BARKER.

REFERENCES CITED

The following references are of record in the file of this patent:

UNITED STATES PATENTS

| Number | Name | Date |
|---|---|---|
| 874,251 | Schelling | Dec. 17, 1907 |
| 2,314,700 | Hanshaw | Mar. 23, 1943 |
| 2,456,757 | Valenta | Dec. 21, 1948 |
| 2,501,839 | Bodle et al. | Mar. 28, 1950 |